(12) United States Patent
Wuidart

(10) Patent No.: US 7,290,151 B2
(45) Date of Patent: Oct. 30, 2007

(54) LOGIC CIRCUIT WITH VARIABLE INTERNAL POLARITIES

(75) Inventor: Sylvie Wuidart, Pourriéres (FR)

(73) Assignee: STMicroelectronics SA, Montrouge (FR)

( * ) Notice: Subject to any disclaimer, the term of this patent is extended or adjusted under 35 U.S.C. 154(b) by 806 days.

(21) Appl. No.: 10/606,161

(22) Filed: Jun. 25, 2003

(65) Prior Publication Data
US 2004/0028234 A1 Feb. 12, 2004

Related U.S. Application Data

(63) Continuation of application No. PCT/FR01/04069, filed on Dec. 19, 2001.

(30) Foreign Application Priority Data
Dec. 26, 2000 (FR) ................................. 00 17002

(51) Int. Cl.
G06F 11/30 (2006.01)
G06F 12/14 (2006.01)
H04L 9/32 (2006.01)
H04K 1/04 (2006.01)
H04K 1/06 (2006.01)

(52) U.S. Cl. ..................... 713/194; 713/189; 713/190; 380/37; 326/37; 326/63

(58) Field of Classification Search ............... 713/194, 713/189, 190; 380/37; 326/37, 63
See application file for complete search history.

(56) References Cited

U.S. PATENT DOCUMENTS 4,968,903 A 11/1990 Smith et al. ................ 307/469
6,349,318 B1 * 2/2002 Vanstone et al. ........... 708/492
6,419,159 B1 * 7/2002 Odinak ...................... 235/492
6,498,404 B1 * 12/2002 Thuringer et al. ........... 307/32

(Continued)

FOREIGN PATENT DOCUMENTS

DE 19936918 4/2000

OTHER PUBLICATIONS

Hennessy, John L. et al. Computer Organization and Design, The Hardware/Software Interface. 1998 Morgan Kaufmann, pp. B2-B11 & B46.*

(Continued)

Primary Examiner—Kambiz Zand
Assistant Examiner—Michael J Simitoski
(74) Attorney, Agent, or Firm—Lisa K. Jorgenson; Allen, Dyer, Dopplet, Milbrath & Gilchrist, P.A.

(57) ABSTRACT

Operation of a logic circuit for performing a desired logic function is scrambled. Logic gates and/or transistors are provided in the logic circuit so that the logic function is performed in at least two different ways. The way in which the logic function is performed is determined by the value of a function selection signal applied to the logic circuit. The function selection signal is random and is applied to the logic circuit, and the function selection signal is refreshed at determined instants for scrambling operation of the logic circuit. For identical data applied at the input of the logic circuit and for different values of the function selection signal, the polarities of certain internal nodes of the logic circuit and/or the current consumption of the logic circuit are not identical.

30 Claims, 4 Drawing Sheets

U.S. PATENT DOCUMENTS

| | | | | |
|---|---|---|---|---|
| 6,654,884 | B2* | 11/2003 | Jaffe et al. | 713/168 |
| 6,658,569 | B1* | 12/2003 | Patarin et al. | 713/194 |
| 6,804,782 | B1* | 10/2004 | Qiu et al. | 713/194 |
| 6,839,847 | B1* | 1/2005 | Ohki et al. | 713/194 |
| 2002/0124178 | A1* | 9/2002 | Kocher et al. | 713/193 |

OTHER PUBLICATIONS

National Semiconductor. "54LS157 . . . Quad 2-Line to 1-Line Data Selectors/Multiplexers", Jun. 1989.*

ON Semiconductor. "MC14001B Series B-Suffix Series CMOS Gates", Aug. 2000.*

Benini, Luca et al. "Energy-Aware Design Techniques for Differential Power Analysis Protection", Jun. 2003, ACM.*

Goubin et al., DES and Differential Power Analysis The Duplication Method, Cryptographic Hardware and Embedded Systems, 1st International Workshop, Ches'99, Worcester, MA, Aug. 12-13, 1999, Proceedings, Lecture Notes in Computer Science, Berlin, Springer, DE, vol. 1717, Aug. 12, 1999, pp. 158-172, XP001001354.

* cited by examiner

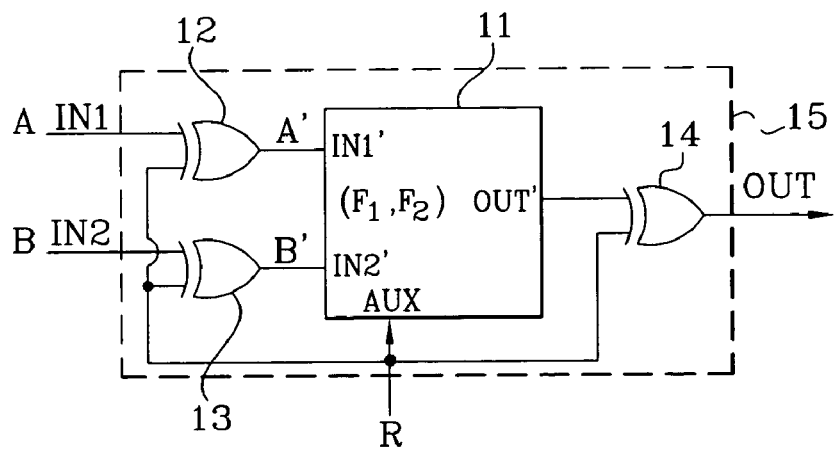
Fig. 3
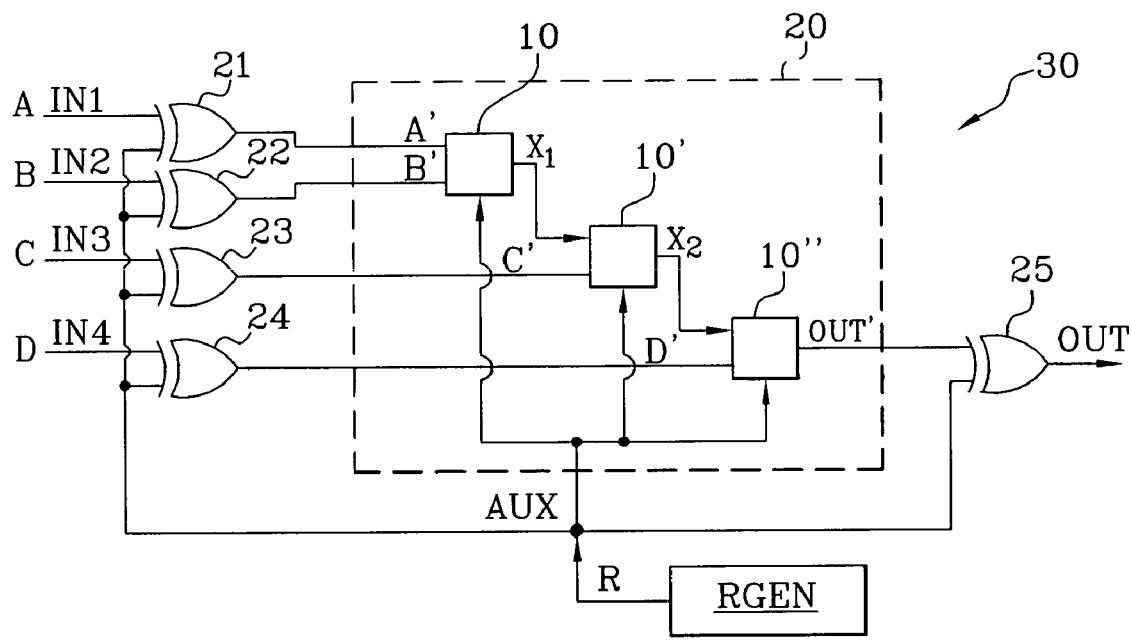
Fig. 4
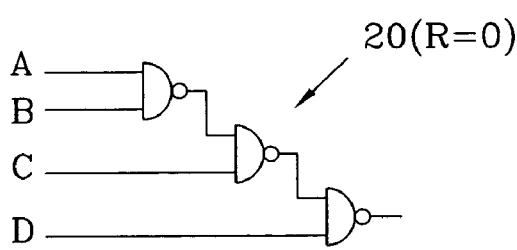 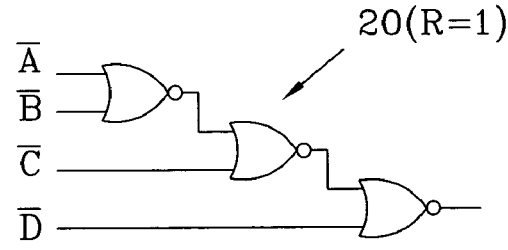
Fig. 5A                   Fig. 5B

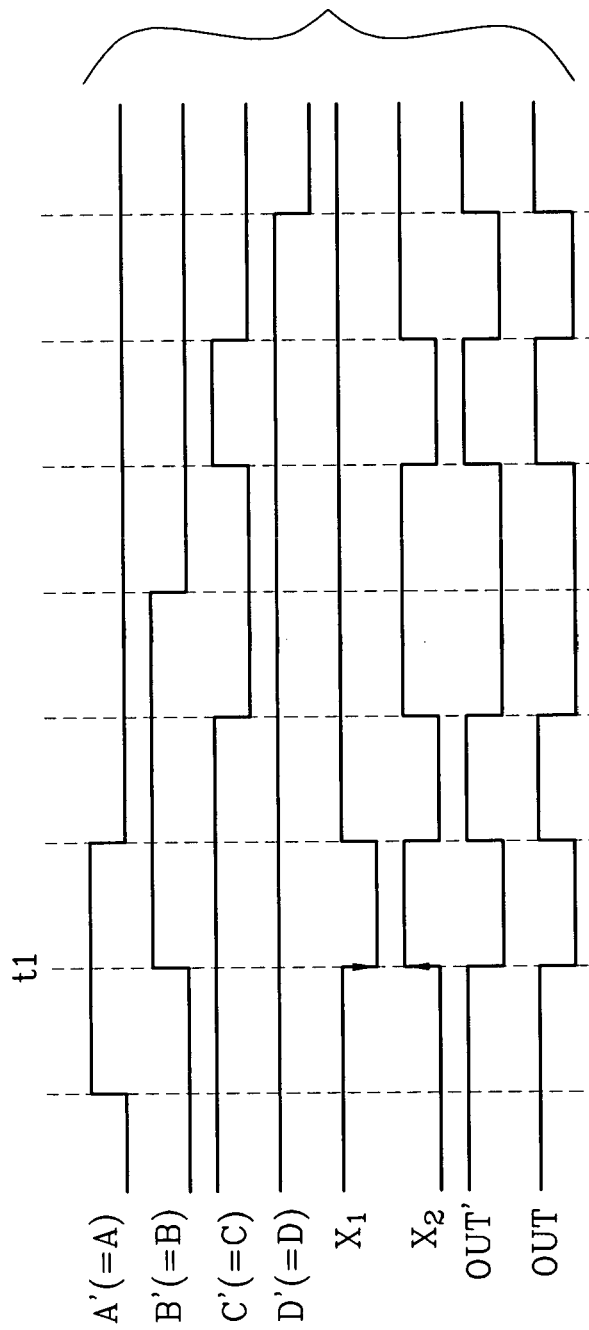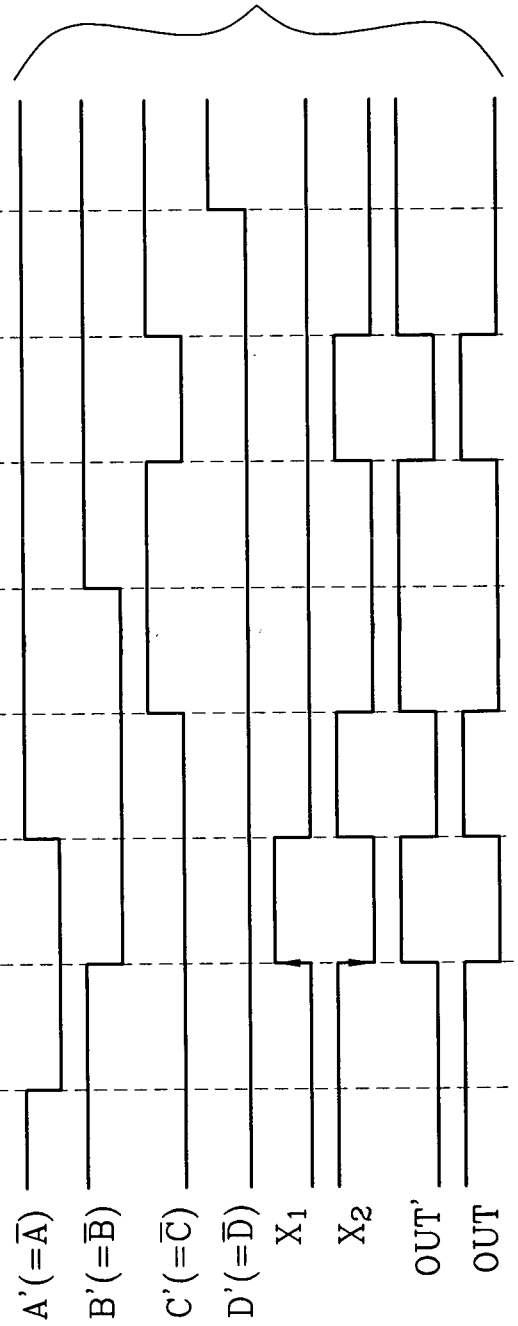

LOGIC CIRCUIT WITH VARIABLE INTERNAL POLARITIES

RELATED APPLICATION

The present application is a continuation of International Application No. PCT/FR01/04069 filed on Dec. 19, 2001, the entire disclosure of which is incorporated herein by reference.

FIELD OF THE INVENTION

The present invention relates to secured integrated circuits and a method for scrambling the operation of logic circuits in these integrated circuits. The present invention particularly relates to integrated circuits in smart cards, electronic labels, electronic badges, and in secured portable electronic objects.

BACKGROUND OF THE INVENTION

Electronic transactions carried out by smart card are secured by using a smart card authentication procedure that uses an encryption algorithm. During the authentication procedure, the terminal used for the transaction sends the smart card a random code. The smart card must respond to the terminal by producing an authentication code which is the transform of the random code by the encryption algorithm. The terminal calculates the transform of the random code and compares the result obtained with the one returned by the card. If the authentication code returned by the card is valid, the transaction is authorized.

In the integrated circuit of a smart card, the encryption algorithm is generally performed by a hard-wired logic circuit, or encryption co-processor, to which a secret key is assigned that is stored in a protected area of the integrated circuit memory. It is essential to guarantee absolute protection of the secret key as the encryption algorithms implemented in the authentication procedures are known, and only the secret key guarantees the tamper resistance of the authentication procedure.

However, in recent years, pirating techniques of integrated circuits have progressed considerably and criminals now have sophisticated analysis methods that enable them to detect the secret keys of the encryption algorithms by monitoring certain logic and/or electric signals that are part of the integrated circuit operation. Some of these methods are based on monitoring the current consumed by an integrated circuit during the execution of confidential operations.

In particular, SPA type (single power analysis) methods and DPA type (differential power analysis) methods can be singled out, the latter being particularly dangerous as they allow a secret key to be discovered without the need to monitor the data circulating on the integrated circuit data bus.

Other pirating methods use electrical probes (so-called probing methods) and are based on monitoring logic signals occurring in the logic circuits, particularly in the encryption circuits. For this purpose, small orifices are made in the integrated circuit board to access the logic circuit nodes. These orifices are then filled with a conductive material to form contact areas on the surface of the integrated circuit from which the polarity of the logic signals can be monitored.

To counter these pirating methods, there are various counter-measures that include, for example, using a random clock signal, using dummy codes, masking the variations in the current consumption of logic circuits by current generators, scrambling the current consumption of these circuits by the use of noise generators, etc.

However, it is well known that each new anti-pirating method devised generally ends up being countered by the criminals, who have powerful calculation and analysis means. Generally speaking, various anti-pirating methods may be combined to provide more efficient protection.

SUMMARY OF THE INVENTION

In view of the foregoing background, an object of the present invention is to provide a method for scrambling the operation of an integrated circuit, particularly a logic circuit performing an encryption algorithm. This method is intended as an additional means of combating piracy, and is intended to be combined, if necessary, with other known anti-pirating methods to improve the security of secured integrated circuits.

This and other objects, advantages and features of the present invention are provided by a logic circuit that performs a logic function with N data inputs and M data outputs, with N being at least equal to 2 and M being at least equal to 1. The logic circuit comprises logic gates and/or transistors to perform the logic function in at least two different ways. The way in which the logic function is performed is determined by the value of a function selection signal applied to the logic circuit.

Thus, for identical data applied at the input of the logic circuit and different function selection signal values, the polarities of certain internal nodes of the logic circuit and/or the current consumption of the logic circuit are not identical.

According to one embodiment, the logic circuit comprises a logic block having N inputs linked to the data inputs of the logic circuit and M outputs linked to the data outputs of the logic circuit. The logic block performs a first logic function or a second logic function according to the value of the function selection signal, and includes a circuit or means for reversing the data applied to the logic block and for reversing the data delivered by the logic block when the selection signal has a determined value. The means for reversing the data applied may comprise EXCLUSIVE-OR gates that receive the function selection signal at one input.

According to another embodiment, the logic circuit comprises logic gates performing a NAND function when the function selection signal has a first logic value and a NOR function when the function selection signal has a second logic value. The logic circuit may be linked to a random signal generator that delivers a random function selection signal. The logic function may also be an encryption function.

The present invention also relates to an encryption circuit comprising a plurality of encryption blocks each comprising a logic circuit according to the present invention.

According to one embodiment, the encryption circuit is linked to a random signal generator for applying a random function selection signal to each encryption block, the value of which is independent of the function selection signal applied to the other encryption blocks.

The present invention also relates to a secured integrated circuit comprising a plurality of logic circuits as described above, and means or a circuit for applying a random-type function selection signal to the logic circuits. The value of the function selection signal is modified at random at least after each integrated circuit reset.

The integrated circuit may comprise a microprocessor or a central processing unit (CPU). The integrated circuit may also be arranged on a portable support to form a smart card or any other equivalent portable electronic object.

The present invention also relates to a logic gate comprising N data inputs and one output. A first group of transistors is arranged to perform a first logic function, a second group of transistors is arranged to perform a second logic function, and function selection means are arranged to receive a function selection signal. The function selection means validates one of the two logic functions at the logic gate output according to the function selection signal value.

According to one embodiment, the function selection means comprise transistors arranged to short-circuit transistors assigned to perform one of the two functions, according to the function selection signal value. The function selection means may also comprise transistors to interrupt conductive paths of the transistors assigned to perform one of the two functions, according to the selection signal value. The logic gate may comprise two inputs. The first logic function may be the NAND function and the second logic function may be the NOR function.

The present invention also relates to a logic circuit comprising a plurality of logic gates as described above. The logic circuit has one input to receive a function selection signal applied to the logic gates.

Another aspect of the present invention relates to a method for scrambling the operation of a logic circuit provided to perform a logic function with N data inputs and M data outputs, with N being at least equal to 2 and M being at least equal to 1. The method preferably comprises a step of providing, in the logic circuit, logic gates and/or transistors arranged to perform the logic function in at least two different ways. The way in which the logic function is performed is determined by the value of a function selection signal applied to the logic circuit. The method may further include a step of applying a random function selection signal to the logic circuit, and a step of refreshing the function selection signal at determined instants so as to scramble the operation of the logic circuit.

According to one embodiment, the method comprises steps of providing, in the logic circuit, a logic block comprising N inputs linked to the data inputs of the logic circuit and M outputs linked to the data outputs of the logic circuit. The logic block performs a first logic function or a second logic function according to the function selection signal value. Logic gates reverse the data applied to the logic block and reverse the data delivered by the logic block when the selection signal has a determined value.

According to another embodiment, the logic block is achieved by logic gates performing the NAND function when the function selection signal has a first logic value, and the NOR function when the function selection signal has a second logic value.

BRIEF DESCRIPTION OF THE DRAWINGS

These and other objects, advantages and features of the present invention shall be presented in greater detail in the following description of the method according to the present invention and of various examples of variable polarity logic circuits according to the present invention, in relation, but not limited to the following figures:

FIG. 3 represents, in block form, a variable polarity logic circuit according to the present invention;

FIG. 4 represents, in block form, an example of a variable polarity logic circuit according to the present invention;

FIGS. 5A and 5B represent two logic functions performed by the variable polarity circuit illustrated in FIG. 4 according to a value of the function selection signal applied to the logic circuit;

FIGS. 6A and 6B are timing diagrams representing logic signals occurring on the nodes of the logic circuit illustrated in FIG. 4 for two function selection signal values;

DETAILED DESCRIPTION OF THE PREFERRED EMBODIMENTS

The present invention is based on the fact, as known by those skilled in the art, that any logic function can be performed using NAND type or NOR type elementary logic gates. Another fact on which the present invention is based is that a logic circuit architecture achieved by NAND gates and an identical logic circuit architecture in which the NAND gates are replaced by NOR gates, respectively perform two logic functions F1 and F2 which have certain similarities. More particularly, the result of the transformation of data A, B, C . . . by the function F1 is the opposite of the result of the transformation of reversed data /A, /B, /C . . . by the function F2, which can be written as:

$$F1(A, B, C \ldots) = /[F2(/A, /B, /C \ldots)] \qquad (1)$$

On the basis of this relation, the present invention suggests achieving logic circuits capable of performing a logic function in two different ways, one using NAND gates and the other using NOR gates.

Figure 1:
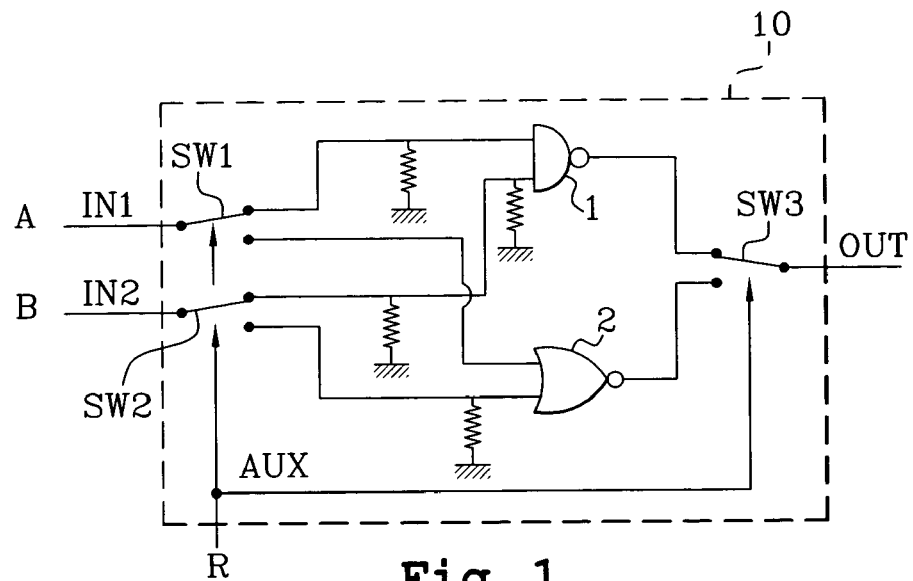
FIG. 1 is a schematic representation of a variable polarity logic gate according to the present invention.
Figure 2:
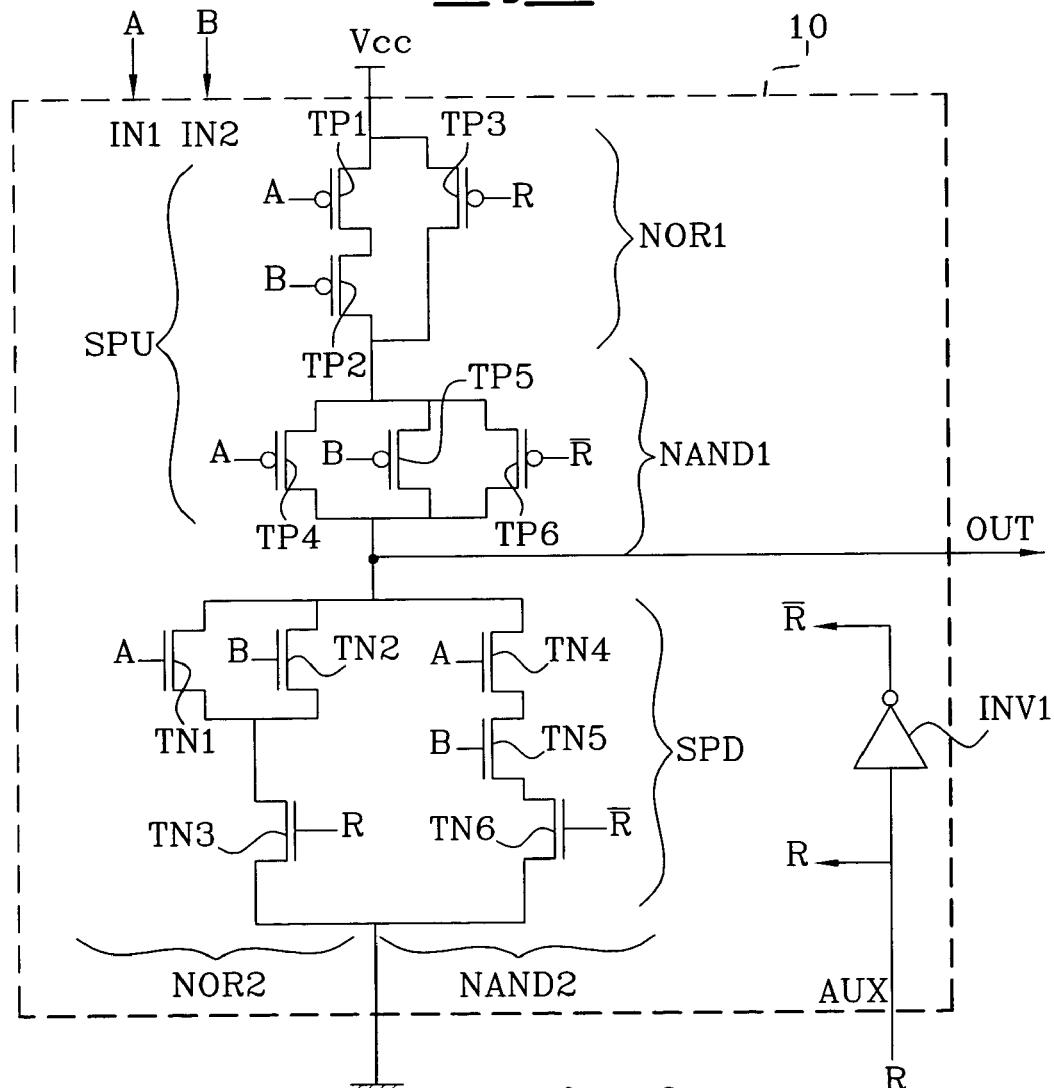
FIG. 2 is an electrical diagram showing one embodiment of the logic gate illustrated in FIG. 1.

Before describing examples of embodiments of these logic circuits, a logic gate with two operating modes shall be described in relation to FIGS. 1 and 2 that can be used to achieve these logic circuits. In particular, this logic gate may form the basic cell of a computer-aided logic circuit design system.

Gate 10 shown in FIG. 1 has two data inputs IN1, IN2, an auxiliary input AUX and one data output OUT, and comprises a NAND gate 1 and a NOR gate 2, each with two inputs. Inputs IN1, IN2 are linked to the corresponding inputs of gates 1 and 2 by two switches SW1, SW2 controlled by a function selection signal R applied at the input AUX. The outputs of gates 1 and 2 are linked to the output OUT by a third switch SW3, also controlled by the signal R.

When the signal R is on 0, inputs IN1, IN2 are connected to the inputs of gate 1 and the output of gate 1 is connected to the output OUT. When the signal R is on 1, inputs IN1, IN2 are connected to the inputs of gate 2 and the output of gate 2 is connected to the output OUT. Therefore, assuming that gate 10 receives bits A and B at the input, gate 10 performs the NAND function when R is equal to 0 and the NOR function when R is equal to 1. In other terms:

$$\mathrm{OUT}_{(R=0)} = /(A*B) = \mathrm{NAND}\ (A,B) \qquad (2)$$

$$\mathrm{OUT}_{(R=1)} = /(A+B) = \mathrm{NOR}\ (A,B) \qquad (3)$$

In addition, it can be noted that:

$$/[\mathrm{NOR}\ (/A, /B)] = /[/(/A+/B)] = /[A*B] = \mathrm{NAND}\ (A,B) \qquad (4)$$

Thus, the opposite of the transform of reversed data /A and /B by the NOR function is equal to the transform of non-reversed data A and B by the NAND function, which forms a special case of the general relation (1) mentioned above.

FIG. 2 represents an example embodiment of logic gate 10 using NMOS and PMOS transistors. Gate 10 comprises a pull-up stage SPU polarized by a supply voltage Vcc and a pull-down stage SPD connected to ground (GND). The connection point of the two stages form the node of output OUT of gate 10. The stage SPU is achieved using PMOS transistors and comprises a stage NOR1 in series with a stage NAND1. The stage SPD is achieved using NMOS transistors and comprises a stage NOR2 in parallel with a stage NAND2.

The stage NOR1 comprises two transistors TP1, TP2 in series and one transistor TP3 in parallel with these two transistors TP1, TP2. The sources of transistors TP1 and TP3 receive the voltage Vcc. The stage NAND1, arranged between stage NOR1 and the node of output OUT, comprises three transistors TP4, TP5, TP6 in parallel. The stage NOR2 comprises two transistors TN1, TN2 in parallel, arranged in series with a transistor TN3. The source of transistor TN3 is connected to ground. The stage NAND2 comprises three transistors TN4, TN5, TN6 in series. The source of transistor TN6 is connected to ground.

Gate 10 also comprises an inverting gate INV1 (achieved using a PMOS transistor and an NMOS transistor, not shown). The input of the inverting gate INV1 is connected to the input AUX, and the output delivers a signal /R. The input IN1 of gate 10, receiving bit A, is connected to the gates of transistors TP1, TP4, TN1, TN4. The input IN2, receiving bit B, is connected to the gates of transistors TP2, TP5, TN2, TN5. The input AUX receiving the signal R is connected to the gates of transistors TP3 and TN3. The output of gate INV1 delivering the reversed signal /R is connected to the gates of transistors TP6, TN6.

When the signal R is equal to 1 and /R is equal to 0, transistors TP3 and TN6 are blocked and transistors TP6 and TN3 are in a transmission state. The stage NAND1 is short-circuited by transistor TP6 and the stage NAND2 is inhibited. Transistor TN6, which links the stage NAND2 to ground, is blocked. The stages NOR1 and NOR2 are active and gate 10 operates like a NOR gate. Inversely, when R is equal to 0 and /R is equal to 1, the stage NOR1 is short-circuited (TP3 in transmission state) and the stage NOR2 is inhibited (TN3 blocked). The stages NAND1 and NAND2 are active and gate 10 operates like a NAND gate.

It will now be assumed, with reference to FIG. 3, that a logic circuit 15 is to be achieved with two inputs IN1, IN2 and one output OUT, for performing a determined logic function F1. It will also be assumed that the F1 function can be achieved by a special arrangement of NAND logic gates.

According to a first aspect of the method of the present invention, the arrangement of NAND gates is maintained but the NAND gates are replaced by gates 10 according to the present invention to form a logic block 11 that has two data inputs IN1', IN2', one data output OUT' and one input AUX. At the input AUX the logic block 11 receives the function selection signal R applied to the logic gates 10 that form it (not shown). This logic block 11 thus performs the function F1 when R is equal to 0 and performs a function F2 when R is equal to 1. Gates 10 then operate as NOR gates. The function F2 is linked to the function F1 by the relation (1) mentioned above.

According to a second aspect of the method of the present invention, three gates 12, 13, 14 of the EXCLUSIVE-OR type are then associated to the logic block 11 to form the complete logic circuit 15. Each gate 12, 13, 14 receives the function selection signal R at a first input. The second input of gate 12 is connected to input IN1 of logic circuit 15, the second input of gate 13 is connected to input IN2 of logic circuit 15, and the second input of gate 14 is connected to the output OUT' of logic block 11. The output of gate 12 is connected to input IN1' of logic block 11, the output of gate 13 is connected to input IN2' of logic block 11, and the output of gate 14 forms the output OUT of logic circuit 15.

By referring to the data applied to inputs IN1 and IN2 of circuit 15 as A and B, and the data applied to inputs IN1', IN2' of block 11 as A' and B', the operation of logic circuit 15 is defined by the following relations:

when R=0:

$A'=A, B'=B$, OUT=OUT'

$$\text{OUT}_{(R=0)} = F1(A, B) \tag{5}$$

when R=1:

$A'=/A, B'=/B$, OUT=/OUT'

$$\text{OUT}_{(R=1)} = /F2(A', B') = /F2(/A, /B) \tag{6}$$

as the EXCLUSIVE-OR gates operate, in relation to data A, B and to the output OUT', as inverting gates when R is equal to 1 and as non-inverting gates when R is equal to 0.

By combining relation (6) with the general relation (1), it results that:

$$\text{OUT}_{(R=1)} = /F2(/A, /B) = F1(A, B) = \text{OUT}_{(R=0)} \tag{7}$$

Thus, as seen from its inputs and its output, logic circuit 15 always performs the same function F1, but in a different way when R=0 and when R=1. The result is that the polarities that the internal nodes of logic circuit 15 differ according to the value of R for identical data A, B applied at the input. Therefore, as it will become clear, assigning a random value to the function selection signal R allows the polarities of the internal signals of logic circuit 15 to be modified at random without modifying the result it delivers, and thus allows its operation and current consumption to be scrambled.

FIG. 4 represents an example embodiment of a logic circuit 30 according to the present invention, with the straightforward case, chosen as an example, in which the function F1 is the NAND function with four inputs. Circuit 30 thus has four inputs IN1 to IN4 receiving bits A, B, C, D and one output OUT delivering the result. In accordance with the architecture proposed above, circuit 30 comprises a logic block 20 with four inputs IN1' to IN4' and one output OUT', along with EXCLUSIVE-OR gates 21 to 24 arranged between inputs IN1 to IN4 and inputs IN1' to IN4', and an EXCLUSIVE-OR gate 25 arranged between output OUT' and output OUT.

Each gate 21 to 25 receives the function selection signal R at an input that is delivered by a random signal generator RGEN. Gates 21 to 24 receive one of bits A, B, C, D at their second input and respectively deliver a bit A', B', C', D' to inputs IN1' to IN4'. Gate 25 receives the output OUT' of block 20 on its second input, and its output forms the output OUT of logic circuit 30. Logic block 20 comprises three cascade-arranged gates 10, 10', 10'' according to the present invention that replace conventional NAND gates. Each gate is monitored by the selection signal R. Gate 10 therefore receives bits A and B at an input, gate 10' receives bit C' at an input and a signal X1 delivered by gate 10, and gate 10" receives bit D' at an input and a signal X2 delivered by gate 10'.

In FIG. 5A, block 20 is equivalent to three cascade-connected NAND gates when R is equal to 0. In FIG. 5B, block 20 is equivalent to three cascade-connected NOR gates when R is equal to 1. In accordance with relation (7), the function performed by logic circuit 30 seen from its inputs and its output is the NAND function, regardless of the value of signal R due to the EXCLUSIVE-OR gates that reverse the inputs and the output of circuit 30 when R is equal to 1.

FIG. 6A shows the operation of circuit 30 when bits A to D applied to inputs IN1 to IN4 have a sequence of determined values, and when R is equal to 0. FIG. 6B shows the operation of circuit 30 when the same sequence of bits is applied to circuit 30 and when R is equal to 1. Each of these figures features the timing diagrams of signals A', B', C', D', X1, X2, OUT' and OUT. These figures clearly show that the polarities of these various signals are reversed when R is equal to 1, although the sequence delivered by the output OUT does not change. Therefore, for example, signal X1 goes to 0 at an instant t1 when R is equal to 0 and goes to 1 at the same instant t1 when R is equal to 1.

As the value of the function selection signal R is preferably random, the logic values occurring on the nodes of this logic circuit have a non-predictive and non-repetitive character. This property of a logic circuit according to the present invention combats the pirating techniques mentioned above, particularly pirating by monitoring logic signals (i.e., probing) or by monitoring the current consumption of the logic circuit (i.e., a DPA-type attack). In fact, as the instantaneous consumption of the logic circuit is a function of the number of switches at 1 for the internal nodes of the circuit (voltage Vcc), it will be understood that this consumption is not the same when R is equal to 1 and when R is equal to 0, including when the data applied at the inputs are identical.

The function selection signal R is refreshed (renewed at random) at precise instants to be determined when the logic circuit is designed. If the sequence represented in FIGS. 6A, 6B is synchronized with a clock signal, signal R can be refreshed at each clock cycle or every K clock cycles, or even be refreshed before the logic circuit 30 is used again (i.e., before each application of a new sequence of bits). When signal R is refreshed at random at each clock cycle or every K clock cycles, the timing diagrams showing the operation of circuit 30 comprise a combination of the timing diagrams in FIG. 6A and the timing diagrams in FIG. 6B, according to the (random) value that signal R has at each clock cycle.

It will be understood that the method according to the present invention is susceptible to any type of logic circuit embodiment. For that purpose, the topography of the logic circuit achieved by NAND gates (or NOR gates) only needs to be determined, then logic gates with two operating modes according to the present invention should be used instead of the classical NAND gates. Inverting or non-inverting means according to the value of signal R, such as the EXCLUSIVE-OR gates described above, are then arranged at the inputs and outputs of the logic block thus achieved.

As it will be clear to those skilled in the art, the scrambling method according to the present invention is susceptible to various other embodiments. Although designing a logic circuit with two operating modes using elementary logic gates 10 with two inputs was suggested above, logic gates according to the present invention with three or more inputs can be used. Furthermore, designing a logic circuit with two operating modes can be done at the transistor level rather than at the gate level as described above.

This means that it is possible, by a determined transistor arrangement, to achieve a logic circuit with two operating modes performing the same function regardless of the operating mode selected, while having different polarities on its internal nodes according to the operating mode selected. Equally, a logic circuit according to the present invention may comprise different operating modes achieved by combining logic gates other than NAND or NOR gates, such as combinations of AND gates, OR gates, inverting gates, EXCLUSIVE-OR gates, for example.

Furthermore, although the logic circuit described above performs the same function in two different ways, as part of the present invention, a logic circuit that performs the same function in three different ways, or four different ways, etc., can be provided. For that purpose, the following method may, for example, be chosen.

The logic function to be performed is synthesized using a first type of logic gate to form a first logic block L1, and is then synthesized using a second type of logic gate to form a second logic block L2, then using a third type of logic gate to form a third logic block F3, etc. Logic blocks L1, L2, L3 . . . are then arranged in parallel. Their inputs are connected to a multiplexer and their outputs are connected to a demultiplexer. The multiplexer and the demultiplexer are controlled by selection signal R (which, in this case, comprises several bits).

According to the value of signal R, the logic function is performed by one of the blocks L1, L2, L3 . . . This embodiment allows a DPA-type current monitoring attack to be countered, as each logic block has its own signature in terms of current consumption. In addition to this method of arranging logic blocks by using conventional logic gates connected in parallel, a multifunctional logic circuit controlled by selection signal R can also be synthesized using multifunctional logic gates according to the present invention, so as to achieve interlaced logic functions that have common internal nodes to counter probing attacks. A more in-depth integration can also be achieved by a design of the multifunctional logic circuit at the transistor level.

Figure 7:
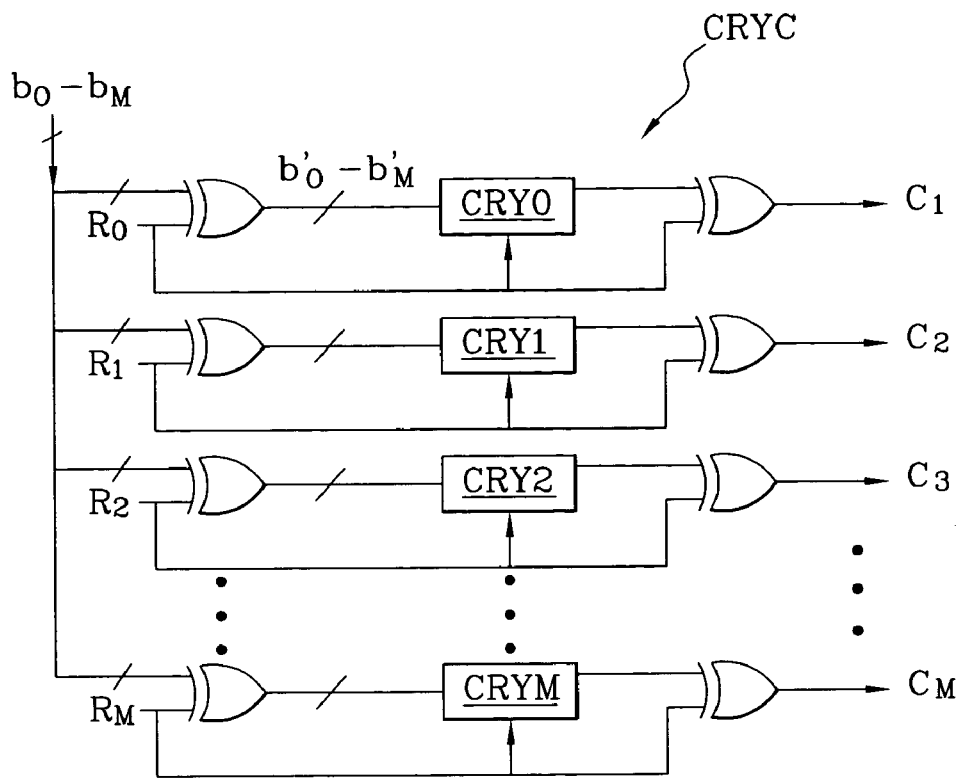
FIG. 7 represents, in block form, an example of embodiment of a variable polarity encryption circuit according to the present invention.

FIG. 7 shows one application of the method of the present invention to the embodiment of an encryption circuit CRYC that has a plurality of coding blocks $CRY_0$ to $CRY_M$. Each block is provided to receive data bits $b_0$ to $b_N$ at an input and deliver a code bit, respectively $C_0$ to $C_M$. This encryption circuit architecture is well known by those skilled in the art and corresponds, for example, to an encryption circuit of the 3DES type.

In accordance with the method of the present invention, each block $CRY_0$-$CRY_M$ is achieved using gates with two operating modes according to the present invention (not shown). The data bits $b_0$-$b_N$ are applied to each block $CRY_0$-$CRY_M$ using individual EXCLUSIVE-OR gates controlled by the signal R, represented in a diagram by EXCLUSIVE-OR gates with N inputs receiving bits $b_0$-$b_N$ and selection signal R. Similarly, each code bit $C_0$ to $C_M$ is sampled at the output of each block $CRY_0$-$CRY_M$ using EXCLUSIVE-OR gates receiving the signal R at their other input.

Preferably, the signal R applied to each block $CRY_0$-$CRY_M$ is statistically different from the signal R applied to the other blocks. Therefore, block $CRY_0$ and the EXCLUSIVE-OR gates associated to block $CRY_0$ receive a random bit $R_0$, block $CRY_1$ and the EXCLUSIVE-OR gates associated to block $CRY_1$ receive a random bit $R_1$ . . . , and block $CRY_M$ and the EXCLUSIVE-OR gates associated to block CRYM receive a random bit $R_M$.

Figure 8:
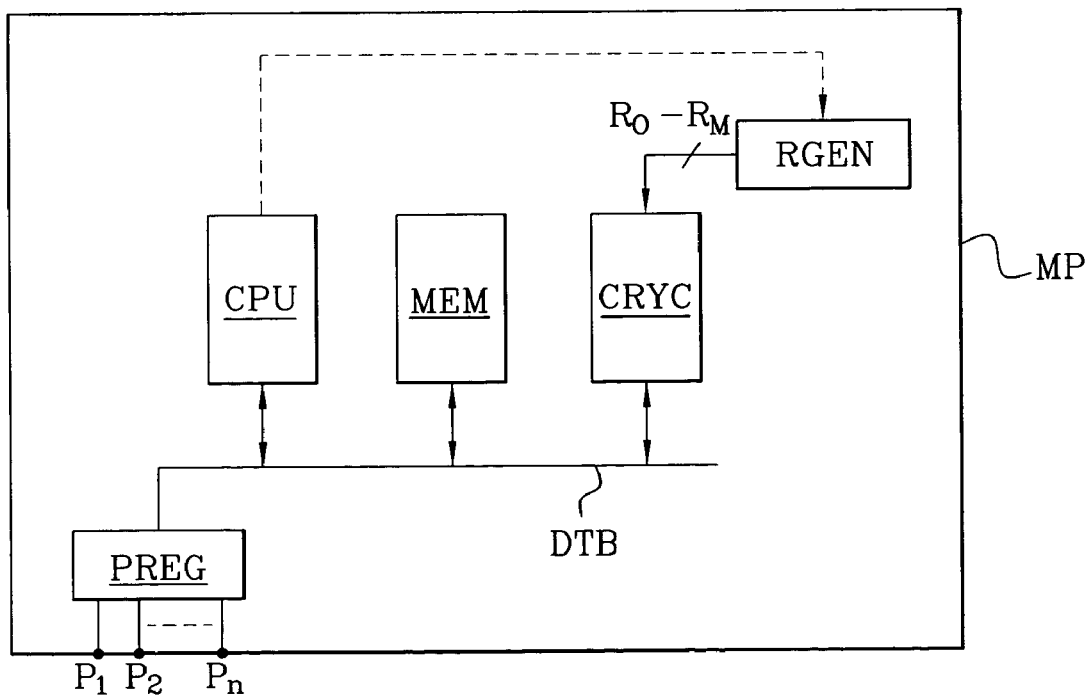
FIG. 8 represents, in block form, an example of a secured integrated circuit architecture comprising variable polarity logic circuits according to the present invention.

FIG. 8 shows an example of the integration of the encryption circuit CRYC into a silicon chip forming a secured microprocessor MP. This silicon chip is designed to be mounted onto a portable support, such as a plastic card, for example, to form a smart card or any other equivalent portable electronic object.

The microprocessor MP comprises a central processing unit CPU, a memory MEM, the encryption circuit CRYC described above and registers PREG linked to input/output ports P1, P2, . . . Pn. These different components are connected to a data bus DTB. A random signal generator RGEN delivers function selection signals $R_0$ to $R_M$ to each of the coding blocks of circuit CRYC (FIG. 7). The generator RGEN is activated by the unit CPU at each new session, i.e., after each microprocessor reset.

Thus, when a bit string is applied to the circuit CRYC at the start of the session to calculate an authentication code, the internal nodes of the coding blocks in the circuit CRYC have polarities and a current consumption that are not constant as compared to the previous session, including when the bit string applied to the circuit CRYC is identical. The polarities of the coding block internal nodes vary from one session to the next according to a random law specific to each block and independent of that of the other coding blocks.

The scrambling method according to the present invention is susceptible of being combined with other known scrambling methods, such as methods of injecting noise into the supply circuit, and using a random internal clock signal, for example.

That which is claimed is:

1. A logic circuit for performing a logic function, and having N data inputs and M data outputs, N being at least equal to 2 and M being at least equal to 1, the logic circuit comprising:
different logic gates or different transistors for performing the logic function in at least two different ways corresponding to different data paths or different electrical paths through the different logic gates or different transistors, the way in which the logic function is performed being based upon a value of a selection signal such that for identical data received at the N data inputs and for different values of the selection signal, at least one of polarities of certain internal nodes of the logic circuit are not identical and current consumption of the logic circuit is not identical;
at least one logic block comprising N inputs linked to the N data inputs of the logic circuit, and N outputs linked to the M data outputs of the logic circuit, said at least one logic block including the different logic gates or different transistors for performing a first or a second logic function corresponding to the different data paths or the different electrical paths through the different logic gates or the different transistors based upon the value of the selection signal; and
reversing circuitry for reversing the data applied to the N inputs of said at least one logic block, and for reversing the data delivered by said at least one logic block based upon the value of the selection signal so that the first and second logic functions are performed by the logic circuit regardless of the value of the selection signal and regardless of the logic function performed by the at least one logic block.

2. A logic circuit according to claim 1, wherein said reversing circuitry comprises a plurality of EXCLUSIVE-OR gates, each EXCLUSIVE-OR gate having an input for receiving the function selection signal.

3. A logic circuit according to claim 1, wherein said at least one logic gate comprises a plurality of logic gates for performing a NAND logic function when the function selection signal has a first logic value, and for performing a NOR logic function when the function selection signal has a second logic value.

4. A logic circuit according to claim 1, wherein the function selection signal is randomly generated.

5. A logic circuit according to claim 1, wherein said at least one logic gate comprises:
a first group of transistors for performing a first logic function;
a second group of transistors for performing a second logic function; and
a function selection circuit connected to said first and second groups of transistors and having an input for receiving the function selection signal for validating one of the first and second logic functions at the output of said at least one logic block based upon the value of the function selection signal.

6. A logic circuit according to claim 5, wherein said first group of transistors comprises first and second stages of transistors, and said second group of transistors comprises first and second stages of transistors; and wherein said function selection circuit comprises at least one first selection transistor for short-circuiting the first stages of transistors based upon the value of the function selection signal.

7. A logic circuit according to claim 6, wherein said function selection circuit further comprises at least one second selection transistor for interrupting conductive paths in the second stages of transistors based upon the value of the function selection signal.

8. A logic circuit according to claim 5, wherein the first logic function is a NAND logic function and the second logic function is a NOR logic function.

9. A logic circuit according to claim 1, wherein the logic function is an encryption function.

10. A secured integrated circuit device comprising:
an encryption circuit comprising
a plurality of encryption blocks, each encryption block for performing a logic function in at least two different ways, the way in which the logic function is performed being based upon a value of a function selection signal such that for identical data received and for different values of the function selection signal, at least one of polarities of certain internal nodes of said encryption circuit are not identical and current consumption of said encryption circuit is not identical; and
a random signal generator connected to said plurality of encryption blocks for randomly providing the function selection signal to each encryption block.

11. A secured integrated circuit device according to claim 10, wherein the value of the function selection signal is randomly modified at least after each reset of the secured integrated circuit device.

12. A secured integrated circuit device according to claim 10, wherein said random signal generator provides a respective function selection signal to each encryption block, with the value of each respective function selection signal being independent of the value of the function selection signals applied to other encryption blocks.

13. A secured integrated circuit device according to claim 10, wherein each encryption block performs first and second logic functions based upon the value of the function selection signal; said encryption circuit further comprising:

reversing circuitry for reversing data applied to inputs of each encryption block, and for reversing data delivered each encryption block based upon the value of the function selection signal.

14. A secured integrated circuit device according to claim 13, wherein said reversing circuitry comprises a plurality of EXCLUSIVE-OR gates, each EXCLUSIVE-OR gate having an input for receiving the function selection signal.

15. A secured integrated circuit device according to claim 10, wherein each encryption block comprises a plurality of logic gates for performing a NAND logic function when the function selection signal has a first logic value, and for performing a NOR logic function when the function selection signal has a second logic value.

16. A secured integrated circuit device according to claim 10, wherein each encryption block comprises:

a first group of transistors for performing a first logic function;

a second group of transistors for performing a second logic function; and a function selection circuit connected to said first and second groups of transistors and having an input for receiving the function selection signal for validating one of the first and second logic functions at an output of said encryption block based upon the value of the function selection signal.

17. A secured integrated circuit device according to claim 16, wherein said first group of transistors comprises first and second stages of transistors, and said second group of transistors comprises first and second stages of transistors; and wherein said function selection circuit comprises at least one first selection transistor for short-circuiting the first stages of transistors based upon the value of the function selection signal.

18. A secured integrated circuit device according to claim 17, wherein said function selection circuit further comprises at least one second selection transistor for interrupting conductive paths in the second stages of transistors based upon the value of the function selection signal.

19. A secured integrated circuit device according to claim 16, wherein the first logic function is a NAND logic function and the second logic function is a NOR logic function.

20. A secured integrated circuit device according to claim 16, wherein said encryption circuit and said random signal generator are configured so that the secured integrated circuit device is at least one of a smart card or another type of portable electronic object.

21. A secured integrated circuit device according to claim 10, further comprising a central processing unit (CPU) connected to said encryption circuit.

22. A method for scrambling operation of a logic circuit that performs a logic function, the logic circuit having N data inputs and M data outputs, with N being at least equal to 2 and M being at least equal to 1, the method comprising:

performing the logic function that is an encryption function in at least two different ways using different logic gates or different transistors, the performing corresponding to function is performed being determined by a value of a selection signal such that for identical data received at the N data inputs and for different values of the selection signal, at least one of polarities of certain internal nodes of the logic circuit are not identical and current consumption of the logic circuit is not identical; and refreshing the function selection signal at predetermined instants so that operation of the logic circuit is scrambled.

23. A method according to claim 22, wherein the logic circuit further comprises at least one logic block comprising N inputs linked to the N data inputs of the logic circuit, and N outputs linked to the N data outputs of the logic circuit, the at least one logic block comprising the different logic gates or different transistors for performing a first or a second logic function corresponding to the different data paths or the different electrical paths through the different logic gates or the different transistors based on the value of the selection signal, and further comprising:

reversing the data applied to the N inputs of the at least one logic block based upon the value of the selection signal; and reversing the data delivered by the at least one logic block based upon the value of the selection signal;

the reversing being performed so that the first and second logic functions are performed by the logic circuit regardless of the value of the selection signal and regardless of the logic function performed by the at least one logic block.

24. A method according to claim 23, wherein the function selection signal is randomly applied to the at least one logic block.

25. A method according to claim 23, wherein the reversing is performed using a reversing circuit comprising a plurality of EXCLUSIVE-OR gates, each EXCLUSIVE-OR gate having an input for receiving the function selection signal.

26. A method according to claim 23, wherein the at least one logic gate comprises a plurality of logic gates for performing a NAND logic function when the function selection signal has a first logic value, and for performing a NOR logic function when the function selection signal has a second logic value.

27. A method according to claim 23, wherein the at least one logic gate comprises a first group of transistors for performing a first logic function, and a second group of transistors for performing a second logic function, and further comprising:

using a function selection circuit connected to the first and second groups of transistors and having an input for receiving the function selection signal for validating one of the first and second logic functions at the output of the at least one logic block based upon the value of the function selection signal.

28. A method according to claim 27, wherein the first group of transistors comprises first and second stages of transistors, and the second group of transistors comprises first and second stages of transistors; and wherein the function selection circuit comprises at least one first selection transistor for short-circuiting the first stages of transistors based upon the value of the function selection signal.

29. A method according to claim 28, wherein the function selection circuit further comprises at least one second selection transistor for interrupting conductive paths in the second stages of transistors based upon the value of the selection signal.

30. A method according to claim 27, wherein the first logic function is a NAND logic function and the second logic function is a NOR logic function.

* * * * *

UNITED STATES PATENT AND TRADEMARK OFFICE
CERTIFICATE OF CORRECTION

PATENT NO. : 7,290,151 B2
APPLICATION NO. : 10/606161
DATED : October 30, 2007
INVENTOR(S) : Wuidart It is certified that error appears in the above-identified patent and that said Letters Patent is hereby corrected as shown below:

| | |
|---|---|
| Column 10, Line 2 | Delete: "function" |
| Column 10, Line 7 | Delete: "the function selection"<br>Insert: -- the selection -- |
| Column 10, Line 10 | Delete: "function" |
| Column 10, Line 22 | Delete: "function" |
| Column 10, Line 29 | Delete: "function" |
| Column 10, Line 34 | Delete: "function" |
| Column 12, Line 1 | Delete: "function" |
| Column 12, Line 24 | Delete: "function" |
| Column 12, Line 30 | Delete: "function" |
| Column 12, Line 34 | Delete: "the function"<br>Insert: -- the -- |
| Column 12, Line 36 | Delete: "the function"<br>Insert: -- the -- |
| Column 12, Line 46 | Delete: "function" |
| Column 12, Line 49 | Delete: "function" |

UNITED STATES PATENT AND TRADEMARK OFFICE
CERTIFICATE OF CORRECTION

| | |
|---|---|
| PATENT NO. | : 7,290,151 B2 |
| APPLICATION NO. | : 10/606161 |
| DATED | : October 30, 2007 |
| INVENTOR(S) | : Wuidart |

It is certified that error appears in the above-identified patent and that said Letters Patent is hereby corrected as shown below:

Column 12, Line 56        Delete: "function"

Signed and Sealed this

Nineteenth Day of August, 2008

JON W. DUDAS
*Director of the United States Patent and Trademark Office*